(12) United States Patent
Obuchi et al.

(10) Patent No.: US 6,597,674 B1
(45) Date of Patent: Jul. 22, 2003

(54) HANDOVER METHOD, BASE STATION, MOBILE STATION, AND MOBILE COMMUNICATION SYSTEM

(75) Inventors: Kazuhisa Obuchi, Kawasaki (JP); Kazuo Kawabata, Kawasaki (JP); Tetsuya Yano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/371,344

(22) Filed: Aug. 10, 1999

(30) Foreign Application Priority Data

Aug. 19, 1998 (JP) .......................................... 10-232933

(51) Int. Cl.[7] ................................................. H04Q 7/00
(52) U.S. Cl. ........................ 370/331; 370/335; 370/477
(58) Field of Search ................................ 370/477, 479, 370/465, 468, 473, 331, 332, 335–337, 343–345, 347, 348, 428, 429, 394

(56) References Cited

U.S. PATENT DOCUMENTS 5,673,260 A * 9/1997 Umeda et al. ............... 370/342
6,339,590 B2 * 1/2002 Kim ........................... 370/331

FOREIGN PATENT DOCUMENTS

WO    WO 97/40592    10/1997

OTHER PUBLICATIONS

Baier, A. and Panzer, H., "Multi–Rate DS–CDMA Radio Interface for 3$^{rd}$ Generation Cellular Systems", Mobile and Personal Communications, Dec. 13–15, 1993, pp. 255–260.*

Hanover Method in CDMA Mobile Communication, Base Station and Mobile Station (Pending U.S. application No. 09/377,138.

* cited by examiner

Primary Examiner—Vivian Chin
Assistant Examiner—James K Moore
(74) Attorney, Agent, or Firm—Katten Muchin Zavis Rosenman

(57) ABSTRACT

The present invention is directed to a handover method, a base station, and a mobile station for a CDMA mobile communication system, to improve the efficiency of inter-frequency handover. Handover is achieved between a mobile station and distributed base stations and the like. The base stations have different traffic channel frequencies. In a normal mode, a signal unit transmitted through a traffic channel consists of four frames. In a compression mode, the base station temporally compresses two normal frames into a single frame period and then transmits the frames twice through the traffic channel. The mobile station switches the reception frequency of a present traffic channel and the reception frequency of a perch channel of the destination base station at intervals of two normal-mode frames at the head of each frame received from the perch channel. The mobile station then restores frames received from the traffic channel in the compression mode to the original frames and processes them. At the same time, the mobile station extracts a system frame number from two frames received from the perch channel.

13 Claims, 15 Drawing Sheets

HANDOVER METHOD, BASE STATION, MOBILE STATION, AND MOBILE COMMUNICATION SYSTEM

BACKGROUND OF THE INVENTION

The present invention relates to a handover method, a base station, a mobile station, and a mobile communication system according to code division multiple access (CDMA).

In a mobile communication system, an exchange station (a base-station controlling station) is connected to base stations. Further, a mobile station may move during communication from the service area of a base station to the service area of another base station. At this time, a handover technique is employed for the mobile station to switch the base station to another without interrupting the communication of the mobile station. Therefore, it is desirable to improve the efficiency of the handover technique.

FIG. 12 shows an example of a handover technique. A mobile communication system includes base stations $101_1$, $101_2$, and the like, an exchange station 102, and a mobile station 103. The mobile station 103 communicates with a fixed station or another mobile station through the base station $101_1$, while the mobile station moves toward the service area of the base station $101_2$ as indicated with an arrow mark. At this time, the exchange station 102 and base station $101_1$, $101_2$ transmit and receive control information to hand over the mobile station 103 from the base station $101_1$ to the base station $101_2$ so that the mobile station 103 may continue the communication.

The above described stations to carry out the handover may be part of a CDMA mobile communication system. If the operating frequencies f1, f2 of the base stations $101_1$, $101_2$ are equal to each other, it is possible to achieve a soft handover by switching the base stations $101_1$, $101_2$ from one to another while maintaining the communication of the mobile station 103 through both the base stations $101_1$, $101_2$. If the operating frequencies f1, f2 are different from each other, a hard handover is required since the reception frequency of the mobile station 103 must be changed.

When being handed over from the base station $101_1$ to the base station $101_2$ in a CDMA mobile communication system, the mobile station 103 finds a time difference between a traffic channel used to communicate with the base station $101_1$ and a perch channel of the base station $101_2$, and then informs the base station $101_1$ of the time difference. The base station $101_1$ then informs the base station $101_2$ of the time difference through the exchange station 102. According to the time difference, the base station $101_2$ adjusts transmission-reception timing with respect to the mobile station 103 and starts to communicate with the mobile station 103.

In order to perform the soft handover without interrupting the communication of the mobile station 103, the base station $101_2$ must obtain a long code phase of the mobile station 103. The mobile station 103 has a long code period of $2^9 \times 72$ frames, and thus the base station $101_2$ is unable to automatically obtain the long code period. Accordingly, the mobile station 103 measures a phase difference between the perch channel of the base station $101_2$ and an outgoing traffic channel.

FIG. 13 shows an example of a signal format employed by perch channels. In FIG. 13, (a) shows a system frame having a period of 36,864 ms, (b) is a radio frame having a period of 10 ms, (c) is a 0.625-ms radio slot, (d) is a first perch channel signal in the radio slot having a pilot PL, data, and a long code mask symbol LM, and (e) is a second perch channel signal in the radio slot having only a long code mask signal LM. In FIG. 13, (f) and (g) show the signal format and long code of the first perch channel, while (h) and (i) show the signal format and group short code of the second perch channel. The time axis of (d) and (e) differs from that of (f) to (i).

One radio frame (b) consists of 16 radio slots, and one super frame (a) consists of 72 radio frames. The first and second perch channels are each made of slot periods. The first perch channel signal of (d) and (f) is spread according to the long code of (g). The long code mask symbol LM of the second perch channel signal of (e) and (h) is spread according to the group short code of (i).

FIG. 14 shows parts of a perch channel transmitter for a base station. Reference numeral 111 designates an antenna, 112, 113 transmitters, 114–116 spreading units, 117 a long code generator, 118 a common short code generator, 119 a group short code generator, and Swa, SWc switches.

The spreading unit 115 spreads data for the first perch channel according to a common short code from the common short code generator 118. The switch Swa is closed except during the period of the long code mask symbol LM (FIG. 13). This enables the spreading unit 114 to spread the data from the spreading unit 115 according to a long code from the long code generator 117. The transmitter 112 modulates the data from the spreading unit 114 into a signal having a transmission frequency, which is then transmitted from the antenna 111.

The switches SWb and SWc are closed in response to the long code mask symbol LM. This enables the spreading unit 116 to spread the data for the second perch channel according to a group short code provided by the group short code generator 119 through the switch SWb. The data from the spreading unit 116 is transferred to the transmitter 113 through the switch SWc and is modulated into a signal having the transmission frequency. The signal is transmitted from the antenna 111 together with the signal of the first perch channel.

The mobile station receives signals from the perch channels of peripheral base stations, despreads the signals according to the common short code, memorizes timing having a high correlative value, uses the timing to despread the signals according to all group short codes used for the second perch channels, and selects a group short code having a high correlative value. For example, a group short code involves 16 long codes, and 16 group short codes are prepared, so that 256 long codes are divided into 16 groups. Sixteen long codes belonging to the group short code having the high correlative value are used to despread the received data, and a long code having a high correlative value is found. The found long code is used to despread the received data and carry out a reception process.

Referring back to FIG. 12, if adjacent base stations $101_1$, $101_2$ employ the same frequency, a single frequency handover operation is carried out. In this case, the mobile station 103 may have a single receiver. The mobile station 103 is provided with a despreading unit for a traffic channel and a despreading unit for a perch channel. This enables the mobile station 103 to select a perch channel having the highest reception level during the handover process. If the adjacent base stations $101_1$, $101_2$ employ different frequencies, a different frequency handover operation is carried out. In this case, the mobile station 103 is provided with a receiver for the traffic channel frequency and a receiver for the perch channel frequency.

Providing the mobile station 103 with the two receivers increases the size, power consumption, and cost of the mobile station. In order to cope with this problem, it has been proposed to provide the mobile station with a single receiver and to switch the reception frequency of the receiver in time division to receive signals from both the traffic and perch channels.

In this case, each base station transmits data through a traffic channel in a compression mode as shown in FIG. 15. In the figure, (a) shows normal frames #1, #2, and the like transmitted in a normal mode at a rate of, for example, 8 kbps, (b) shows compressed frames that are made from the normal frames and are transmitted in a compression mode at a rate of, for example, 16 kbps. In other words, the compression mode temporally compresses two normal frames into a single frame to form a spare frame and transmits the compressed and spare frames with transmission power that is double the transmission power of the normal mode.

As shown in (c) of FIG. 15, the mobile station alternately receives signals from a traffic channel TRF in a period ta and a perch channel PER in a period tb that corresponds to the spare frame. As shown in (d) of FIG. 15, the single receiver of the mobile station is switched between frequencies f1 and f2 to alternately receive signals from the traffic channel TRF and perch channel PER. The signal received from the traffic channel TRF is decompressed two times to recover the original data, on which a reception process is carried out. During the period tb, a signal from the perch channel PER is received.

To carry out the handover, the mobile station must find a time difference between a present traffic channel and a perch channel of a destination base station accurately, for example, within a predetermined chip timing. At this time, a shift of a frame between the present traffic channel and the perch channel is detected by extracting a system frame number contained in a frame received from the perch channel. The head of each frame is then detected according to, for example, a synchronous signal. It is possible, therefore, to detect a shift between the head of a frame from the traffic channel and the head of a frame from the perch channel. Thus, time difference information including the frame shift and head shift is provided to the destination base station through the exchange station.

In practice, however, the perch channel adds an error detection code for every two frames including a radio frame ((b) of FIG. 13) that contains a system frame number and then interleaves the frames. A unit in which the error detection code adding process, an error correction coding process and the interleaving process are carried out is called a signal unit.

The mobile station receives the signal unit, deinterleaves the signal unit, carries out an error correction decoding process on the signal unit, detects any error, and identifies the system frame number of the signal unit. In other words, the mobile station must receive two frames of a signal unit from the perch channel. If the perch channel transmits the frames in a normal mode, the mobile station can receive only one frame in the reception period tb from the perch channel PER, i.e., the spare period made in the compression mode of (b) of FIG. 15. Therefore, the mobile station is unable to identify the system frame number.

To cope with this problem, it is possible to form a two-frame spare space so that the mobile station may receive two frames from the perch channel. A traffic channel presently communicating with the mobile station and a perch channel of a destination base station are asynchronous with each other. Thus, frames from the perch channel may be shifted as shown in either (e) or (f) of FIG. 15 at some time. In other words, in order to receive two frames from the perch channel in the asynchronous state, a single two-frame spare space may be insufficient. Therefore, a four-frame spare space is needed as shown in (g) of FIG. 15.

SUMMARY OF THE INVENTION

An object of the present invention is to reliably receive data from a perch channel without increasing a delay during a handout operation.

These and other objects are met by a handover method according to the present invention for a CDMA mobile communication system including base stations and the like, and a mobile station. The method includes that each base station compress frames having a number which is at least double the number of frames contained in a normal-mode signal unit into a compressed signal unit. Further, to repeatedly and continuously transmit the compressed signal unit providing the mobile station a reception period to receive frames equivalent to the normal-mode signal unit from a perch channel. In a period of, for example, four normal frames, the mobile station can reliably receive two frames from a perch channel as well as four compressed frames from a traffic channel.

The mobile station switching between receiving the compressed signal unit from a traffic channel within a normal-mode unit period corresponding to the normal-mode signal unit and receiving frames equivalent to the normal-mode signal unit from the perch channel within the normal-mode unit period.

The handover method also includes, while the base station is in the compression mode of transmission, alternately receiving frequencies at intervals of the normal-mode unit period according to frames received from the perch channel. Further, receiving frames alternately from the traffic and perch channels, and extracting a system frame, number from the frames received from the perch channel. If a signal unit consists of two frames, the mobile station can receive two frames from a perch channel to extract a system frame number therefrom.

The handover method also may include receiving frames alternately from the traffic and perch channels. However, the mobile station is unable to receive a given frame from the head thereof, the mobile station receives a first signal unit containing the second half of the given frame during a first unit period from the traffic channel. Further, receiving a second signal unit containing the first half of the given frame during a second unit period to recover the original state of the given frame by combining the first and second halves thereof.

According to the present invention, a base station is also provided for carrying out CDMA communication with a mobile station. The base station includes a data processor for temporally compressing frames to a number that is at least double the number of frames contained in a normal-mode signal unit into a compressed signal unit. The base station also includes memory for temporarily storing the compressed signal unit. A transmission controller is also included for transmitting the compressed signal unit, reading the compressed signal unit out of the memory and transmitting the read compressed signal unit.

According to the present invention, a mobile station is also provided for carrying out CDMA communication with a base station. The mobile station includes a receiver for switching between a traffic-channel reception frequency and a perch-channel reception frequency. This enables signals to be received alternately from the traffic and perch channels when the base station transmits signals through the traffic channel in a compression mode. A reception controller is also included for detecting the head of a frame received from the perch channel and then switching the traffic- and perch-channel reception frequencies from one to another at the detected frame head at intervals of a normal-mode unit period.

The mobile station also may include a despreading unit for switching a despreading code for the traffic channel and a despreading code for the perch channel in synchronization with the switching of the traffic- and perch-channel reception frequencies in the receiver.

The mobile station may also include a reception controller for shifting the timing of the switching of the traffic-and-perch-channel reception frequencies in the receiver by a frame of the perch channel so that a system frame number may be extracted.

The mobile station may further include a memory for temporarily storing frames received from the traffic channel when the receiver switches the traffic- and perch-channel reception frequencies from one to another. A read controller also may be included for reading each frame out of the memory from the head thereof. If unable to read any frame from the head thereof, reading the frame lastly and combining divided parts thereof together.

According to the present invention, a mobile communication system is provided including distributed base stations and a mobile station that carries out CDMA communication with the base stations. The base stations each compress frames having a number that is at least double the number of frames contained in a normal-mode signal unit to form a compressed signal unit. Further, repeatedly and continuously transmitting the compressed signal unit. The mobile station including a receiver for switching a traffic-channel reception frequency and a perch-channel reception frequency from one to another. A reception controller also included in the mobile station for detecting the head of a frame received from the perch channel and switching the traffic- and perch-channel reception frequencies from one to another at the detected frame head at intervals of a normal-mode unit period corresponding to the normal-mode signal unit.

DETAILED DESCRIPTION

Figure 1:
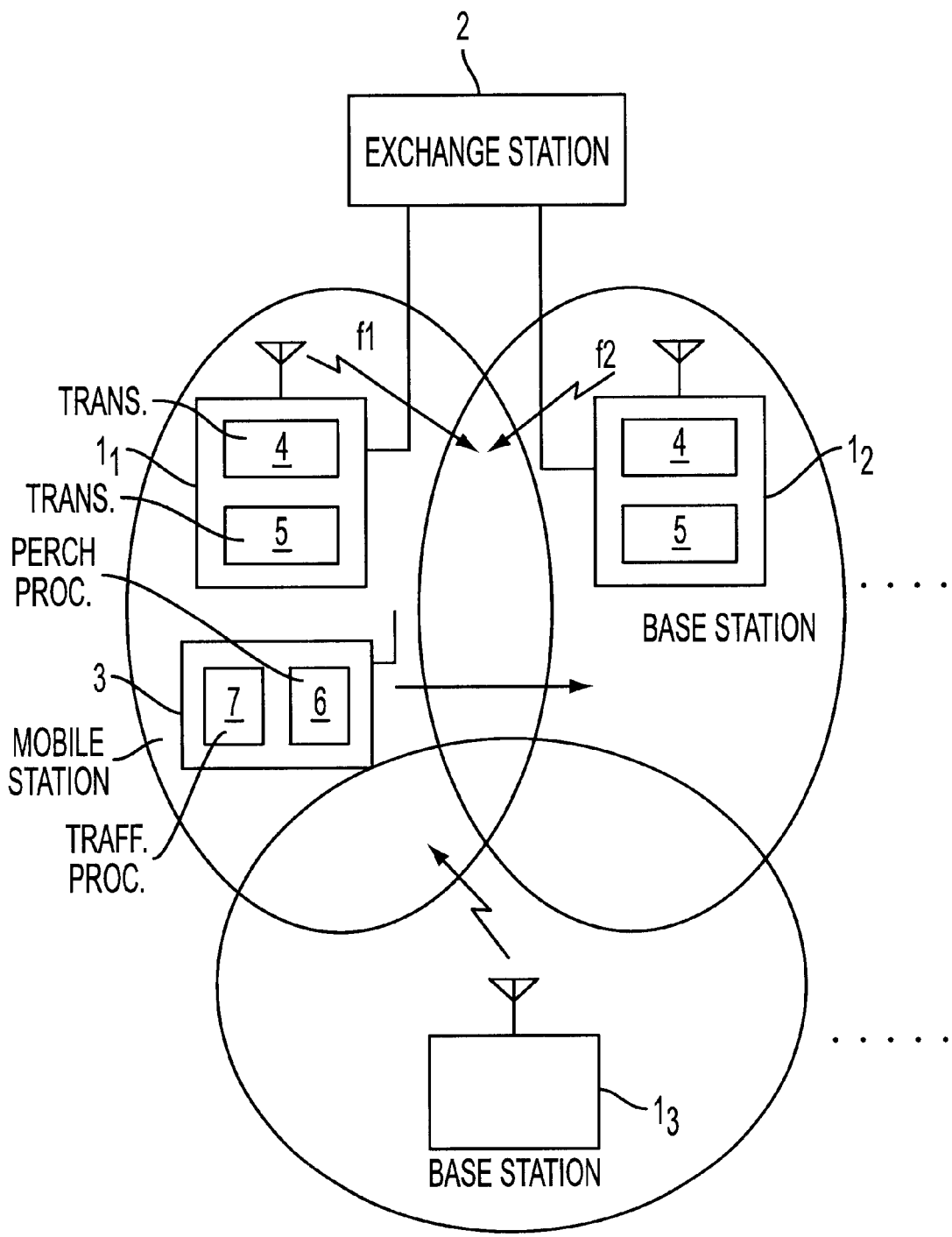
FIG. 1 is a diagram showing a mobile communication system according to the present invention.

FIG. 1 shows a mobile communication system according to the present invention. Reference numerals $1_1$, $1_2$, $1_3$, and the like designate base stations, 2 is an exchange station, 3 is a mobile station, 4 is a traffic channel transmitter, 5 is a perch channel transmitter, 6 is a traffic channel reception processor and 7 is a perch channel reception processor.

The base stations $1_1$, $1_2$ may be installed adjacent to each other in different countries, different system management areas, or specific congested areas and have different transmission frequencies f1, f2. The mobile station 3 moves in the direction of the arrow while maintaining communication. In this case, a different-frequency handover is carried out, and the base station $1_1$ changes the traffic channel transmitter 4 to a compression mode.

The compression mode saves a perch channel reception period corresponding to a normal unit of frames by repeatedly temporally compressing the frames at a rate double the normal frames of one normal-mode signal unit. For example, the compression mode handles four normal frames as a unit, temporally compresses two normal frames into a compressed frame and then transmits the compressed frame two times. As in the prior art, the compressed frame is transmitted with transmission power that is about double normal transmission power. As a result, the compression mode causes no dead space and establishes a continuous transmission state. The compression mode may always be achieved if the adjacent base stations $1_1$, $1_2$ operate at different transmission frequencies or may be started after a normal mode when the reception level of the base station $1_1$ and the mobile station 3 deteriorates.

The base station $1_1$ issues a report to the mobile station including various kinds of information. Accordingly, the base station $1_1$ may inform the mobile station 3 of the start of the compression mode through a control channel. Upon receiving such information, the mobile station 3 switches the reception of the traffic channel of the base station $1_1$ to the compression mode. This enables the mobile station 3 to switch between the traffic channel of the base station $1_1$ and a perch channel of the destination base station $1_2$.

Figure 2:
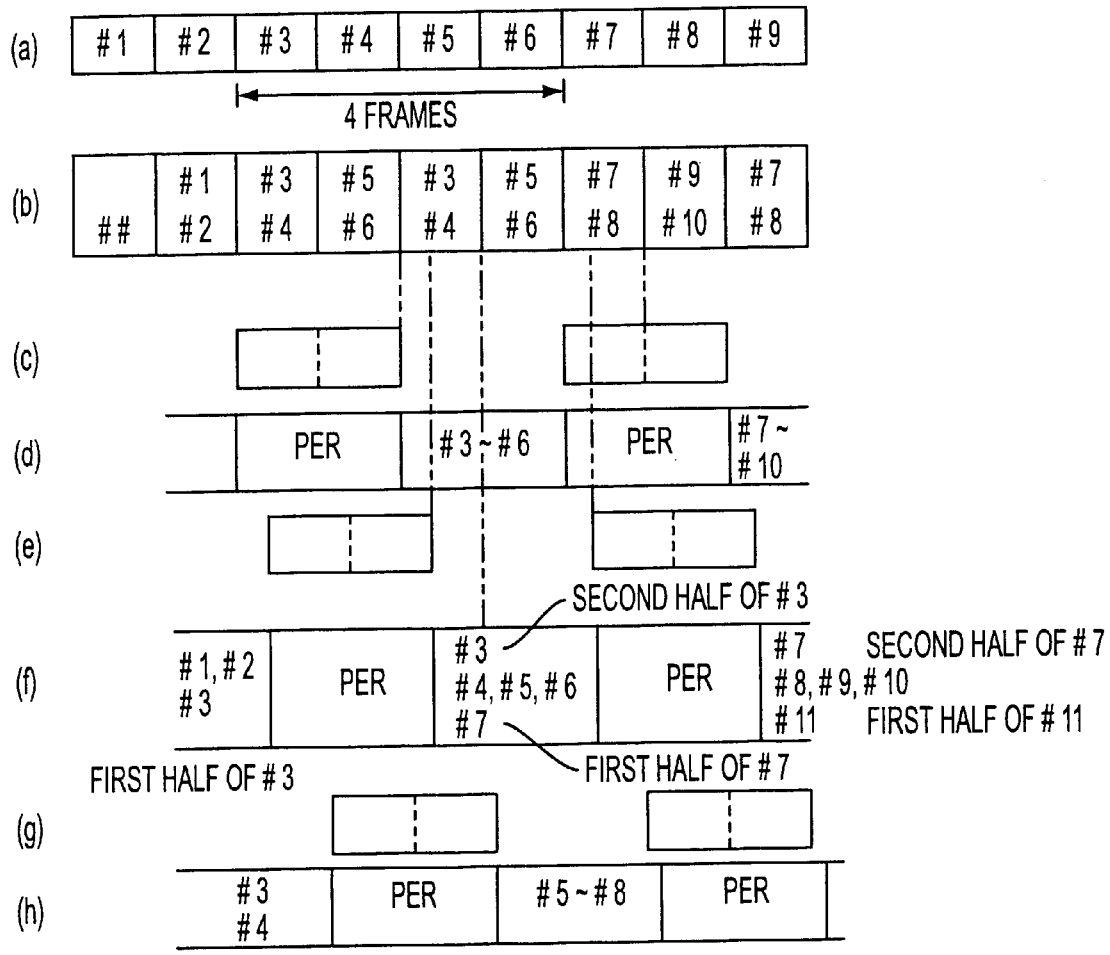
FIG. 2 is a diagram showing the operation of the mobile communication system of FIG. 1.

When a signal unit consists of two frames, the compression mode of the present invention temporally compresses four normal frames such as frames #3 to #6 into two compressed frames as shown in (a) of FIG. 2. One compressed frame consists of frames #3 and #4, while the other consists of #5 and #6 as shown in (b) of FIG. 2. The two compressed frames are transmitted twice to realize a continuous transmission state.

If two frames from a perch channel of the destination base station 12 are aligned with the compressed frames #3 to #6 as shown in (c) of FIG. 2, the mobile station 3 detects the head of the frames of the perch channel and switches the reception of the perch channel to the reception of the traffic channel. As shown in (d) of FIG. 2, the mobile station receives two frames from the perch channel PER of the destination base station $1_2$ during a period in which the presently communicating base station $1_1$ transmits a first set of the compressed frames #3 to #6 through the traffic channel. Thereafter, the mobile station receives a second set of the compressed frames #3 to #6 from the traffic channel of the base station $1_1$.

The mobile station then receives two frames from the perch channel PER of the base station $1_2$, and a second set of compressed frames #7 to #10 which are also transmitted twice through the traffic channel of the base station $1_1$. In this way, the mobile station 3 alternates the traffic channel frequency and perch channel frequency to receive the signals therefrom. At the same time, the mobile station 3 switches the traffic channel reception processor 6 and perch channel reception processor 7 from one to another.

This enables the mobile station to detect the head of a frame received from a perch channel by switching the reception frequency to the perch channel frequency at a given radio frame. Further, the mobile despreads the received data with a common short code and detects a band having a high correlative value. The data is also despread with group short codes at the timing and selects group short code having a high correlative value. The mobile station uses this group short code to detect the head of the radio frame received from the perch channel. The mobile station may despread the received data with long codes belonging to the selected group short code, select one of the long codes, and detects the head of the radio frame received from the perch channel.

The traffic channel reception processor 6 of the mobile station 3 carries out a decompression process on every four compressed frames to provide successive frames. The perch channel reception processor 7 also receives two frames from the perch channel of the destination base station $1_1$ to extract a system frame number therefrom and detect a displacement of the head of the frames. This detected information is provided to the base station $1_1$.

If two frames from the perch channel are provided as shown in (g) of FIG. 2, the mobile station 3 receives four compressed frames #5 to #8 from the traffic channel of the base station $1_1$ as shown in (h) of FIG. 2. The mobile station 3 then receives two frames from the perch channel PER of the destination base station $1_2$ and four compressed frames #9 to #12 from the traffic channel. Similar to the processes explained with reference to (c) and (d) of FIG. 2, the frames from the traffic channel are successively processed, and the two frames from the perch channel are received and processed.

If the head of a frame from the perch channel deviates from the head of a frame from the traffic channel as shown in (e) of FIG. 2, the mobile station 3 detects the head of the frame from the perch channel as shown in (f) of FIG. 2 and switches the reception of the perch channel to the reception of the traffic channel. As a result, the mobile station receives the second half of a frame #3, frames #4, #5 and #6, and the first half of a frame #7 from the traffic channel of the base station $1_1$. Thereafter, the mobile station receives two frames from the perch channel PER of the destination base station $1_2$. Then the second half of the frame #7, frames #8, #9 and #10, and the first half of a frame #11 from the traffic channel of the base station $1_1$ are received.

For any frame whose first and second halves have separately been received, the mobile station 3 temporarily stores the first half in a memory, receives the second half thereafter and combines the first and second halves together. As a result, as in the reception process for receiving a frame whose head is correctly received, the mobile station can correctly receive and process the separately received frame.

As explained above, the present invention provides a four-frame period to ensure that two frames are received from the perch channel. Reception periods other than the ones for receiving frames from the perch channel are used to receive frames from the traffic channel. As a result, the traffic channel involves only a delay of two frames.

Figure 3:
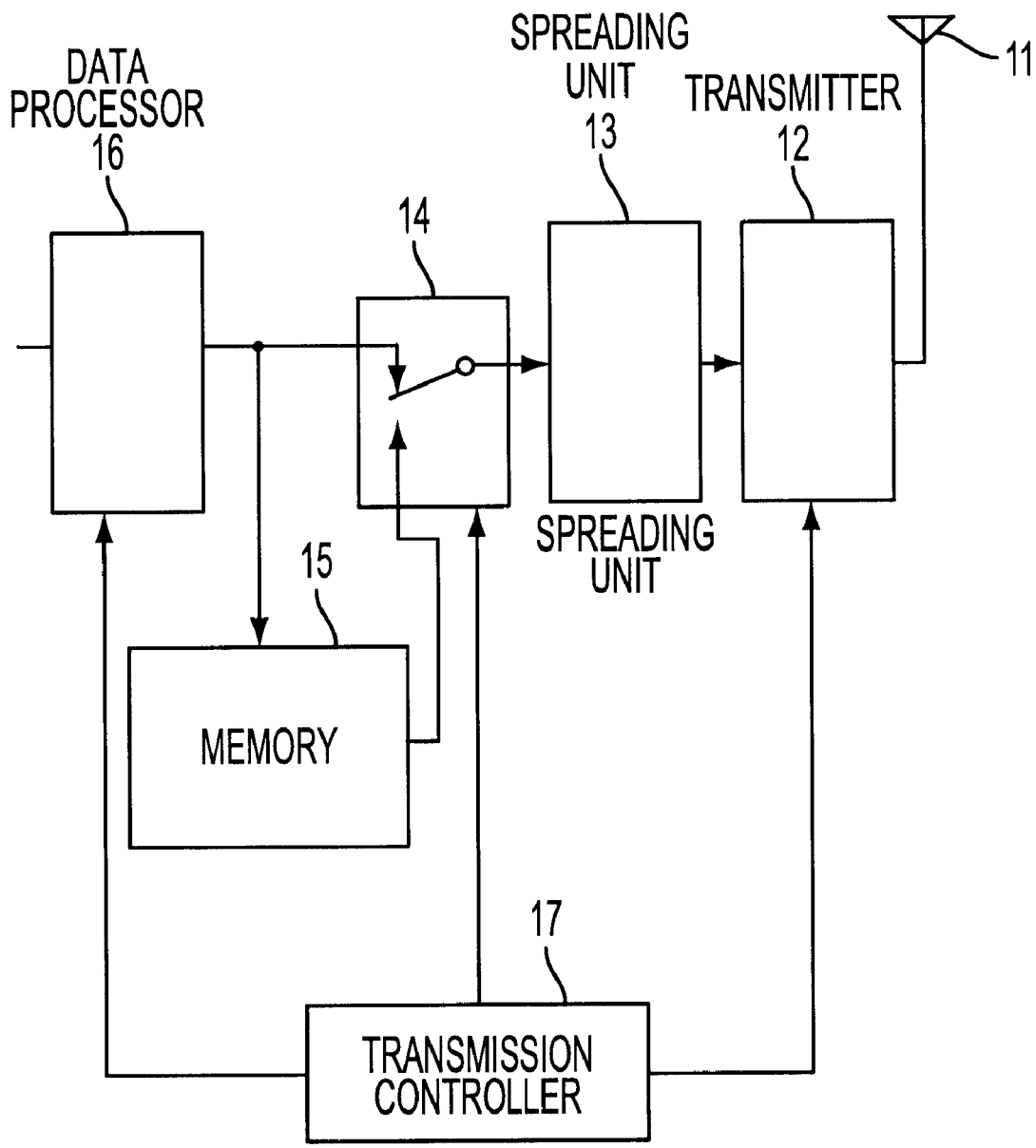
FIG. 3 is a diagram showing a base station according to the present invention.

FIG. 3 shows a base station according to the present invention. Reference numeral 11 designates an antenna, 12 a transmitter, 13 a spreading unit, 14 a switch, 15 a memory; 16 a data processor, and 17 a transmission controller. Reception functions and perch channel transmission functions are omitted from FIG. 3.

Depending on the normal and compression modes, the transmission controller 17 controls the transmitter 12, data processor 16, and switch 14. In the compression mode, the transmission controller 17 switches the switch 14 at intervals of two normal-mode frames. In the normal mode, the switch 14 is set as shown in the figure and the data processor 16 is controlled to provide normal frames. The spreading unit 13 despreads each frame with a long code for the base station. Further, the transmitter 12 modulates the frames into a signal having a transmission frequency, and the signal is then transmitted from the antenna 11.

In the compression mode, the transmitter controller 17 controls the data processor 16 to temporally compress two normal frames as shown in ((a) of FIG. 2) into one compressed frame. The switch 14 is also controlled to switch at intervals of two normal-mode frames. For example, four normal frames #3 to #6 are temporally compressed into two compressed frames. These compressed frames are than supplied to the spreading unit 13 through the switch 14 and to the memory 15. The spreading unit 13 spreads the compressed frames #3 and #4 with the long code corresponding to the base station and spreads the next compressed frames #5 and #6 with a similar long code.

After spreading the four frames #3–#6, the transmission controller 17 switches the switch 14 to the memory 15. The compressed frames #3–#6 are sequentially read out of the memory 15 and then supplied to the spreading unit 13, which spreads them accordingly. As shown in (b) of FIG. 2, four normal frames grouped in a unit are. temporally compressed into two frames, which are transmitted twice. In the compression mode, transmission power is doubled compared with that of the normal mode.

Figure 4:
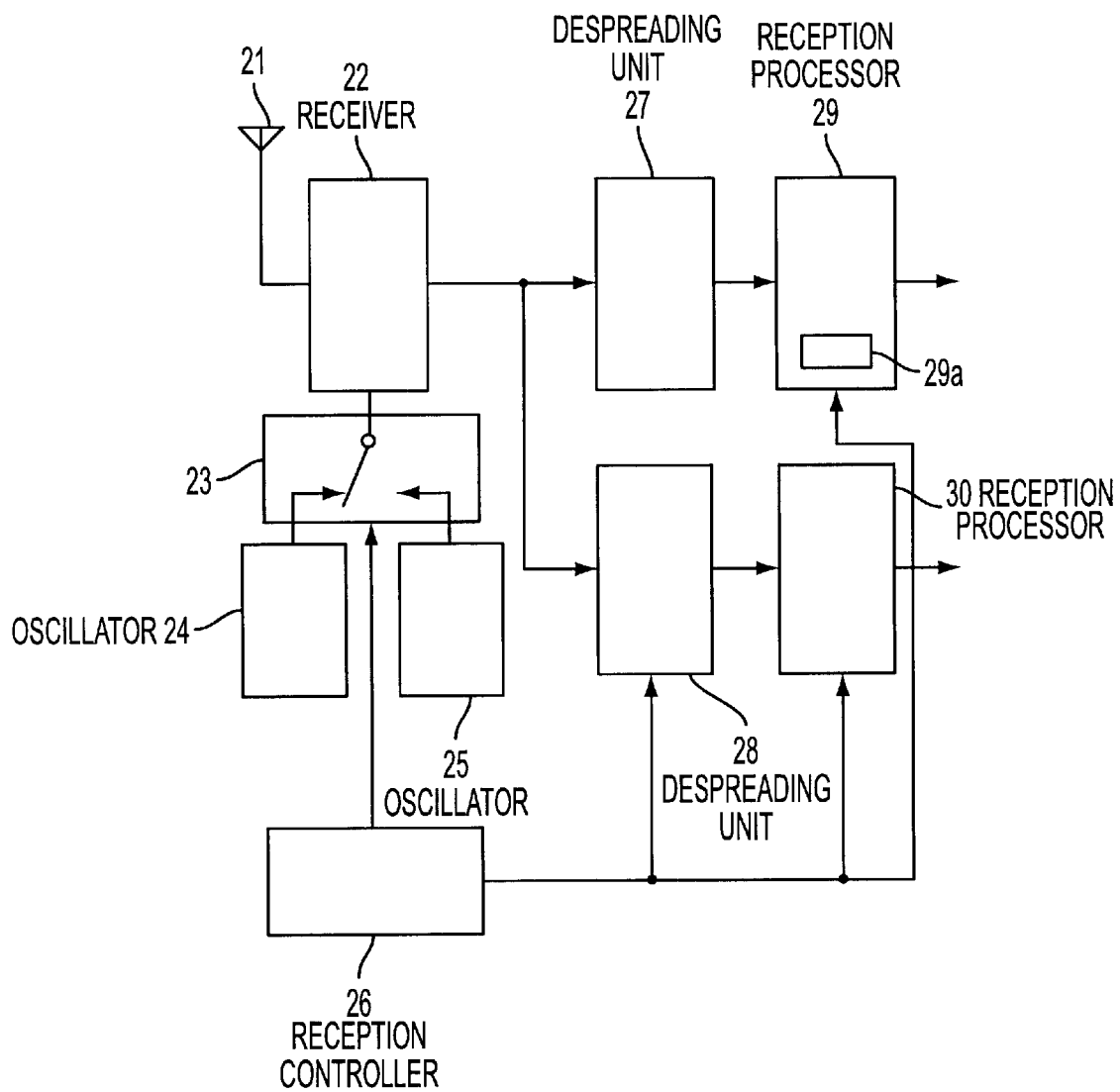
FIG. 4 is a diagram showing a first embodiment of a mobile station according to the present invention.

FIG. 4 shows a first embodiment of a mobile station according to the present invention. Reference numeral 21 designates an antenna, 22 a receiver, 23 a switch, 24 a traffic channel oscillator, 25 a perch channel oscillator, 26 a reception controller, 27 a traffic channel despreading unit, 28 a perch channel despreading unit, 29 a traffic channel reception processor, 30 a perch channel reception processor, and 29a a memory. Transmission functions, etc., are omitted from the figure.

When a base station transmits a signal through a traffic channel in the normal mode, the reception controller 26 switches the switch 23 to the position shown in FIG. 4. This enables a local oscillation signal from the traffic channel oscillator 24 to be supplied to the receiver 22 to set a traffic channel frequency reception state. The despreading unit 27 then despreads received signals according to a long code corresponding to the base station, and the reception processor 29 processes the data. At this time, the memory 29a is not used.

When the base station transmits a signal through the traffic channel in the compression mode, the reception controller 26 controls the switch 23 for a period corresponding to two normal frames. This enables a local oscillation signal from the oscillator 25 to be supplied to the receiver 22 to change the reception frequency. The memory 29a of the reception processor 29 is used to expand data transmitted through the traffic channel in the compression mode. For example, frames received at 16 kbps in the compression mode are written into the memory 29a and are read at 8 kbps for normal frames.

The switch 23 enables the oscillators 24, 25 to be switched from one to another to alternate the traffic channel frequency and the perch channel frequency. When the oscillator 25 is activated to receive a signal from the perch channel, the despreading unit 28 despreads the received signal according to a common short code. This provides a high correlative value, which is memorized. At this time, the signal is despread with group short codes, and a group short code having a high correlative value is selected. The signal is then sequentially despread according to long codes belonging to the selected group short code, and a long code having a high correlative value is selected.

The reception processor 30 detects the head of a frame received from the perch channel as well as a reception level. The head of the frame is provided to the reception controller 26, which switches the switch 23 at the timing of the head of the frame so that two frames from the perch channel may be received.

Receiving two frames from the perch channel enables the mobile station to extract a system frame number. It also enables the mobile station to find a time difference between the head of a frame from the present traffic channel and the head of a frame from the perch channel. This time information is provided to the base station, which transfers it to the destination base station through the exchange station.

Figure 5:
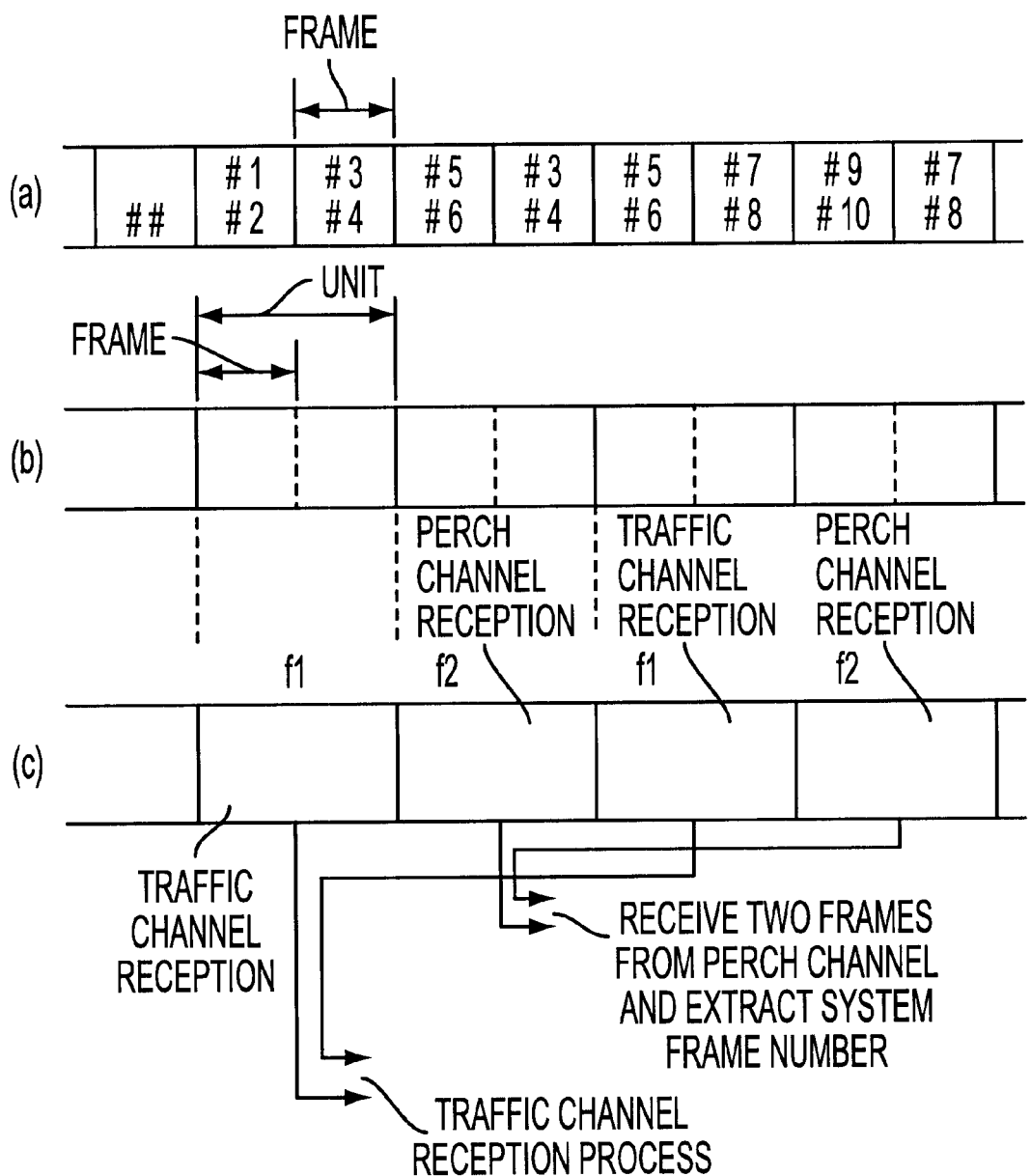
FIG. 5 is a diagram showing the operation of the mobile station of FIG. 4.

FIG. 5 shows the operation of the mobile station of FIG. 4. In FIG. 5, (a) shows frames transmitted from the base station to the mobile station through the traffic channel in the compression mode and (b) shows frames transmitted through the perch channel of the destination base station. The head of a frame from the perch channel is aligned with the head of a frame from the traffic channel. In this case, as shown in (c) of FIG. 5, the mobile station switches the oscillators 24 and 25 to alternate the traffic-channel reception frequency and the perch-channel reception frequency. Thus, two frames are received from the perch channel and four compressed frames are received from the traffic channel. After receiving two frames from the perch channel, the mobile station extracts a system frame number therefrom, while receiving complete frames from the traffic channel.

Figure 6:
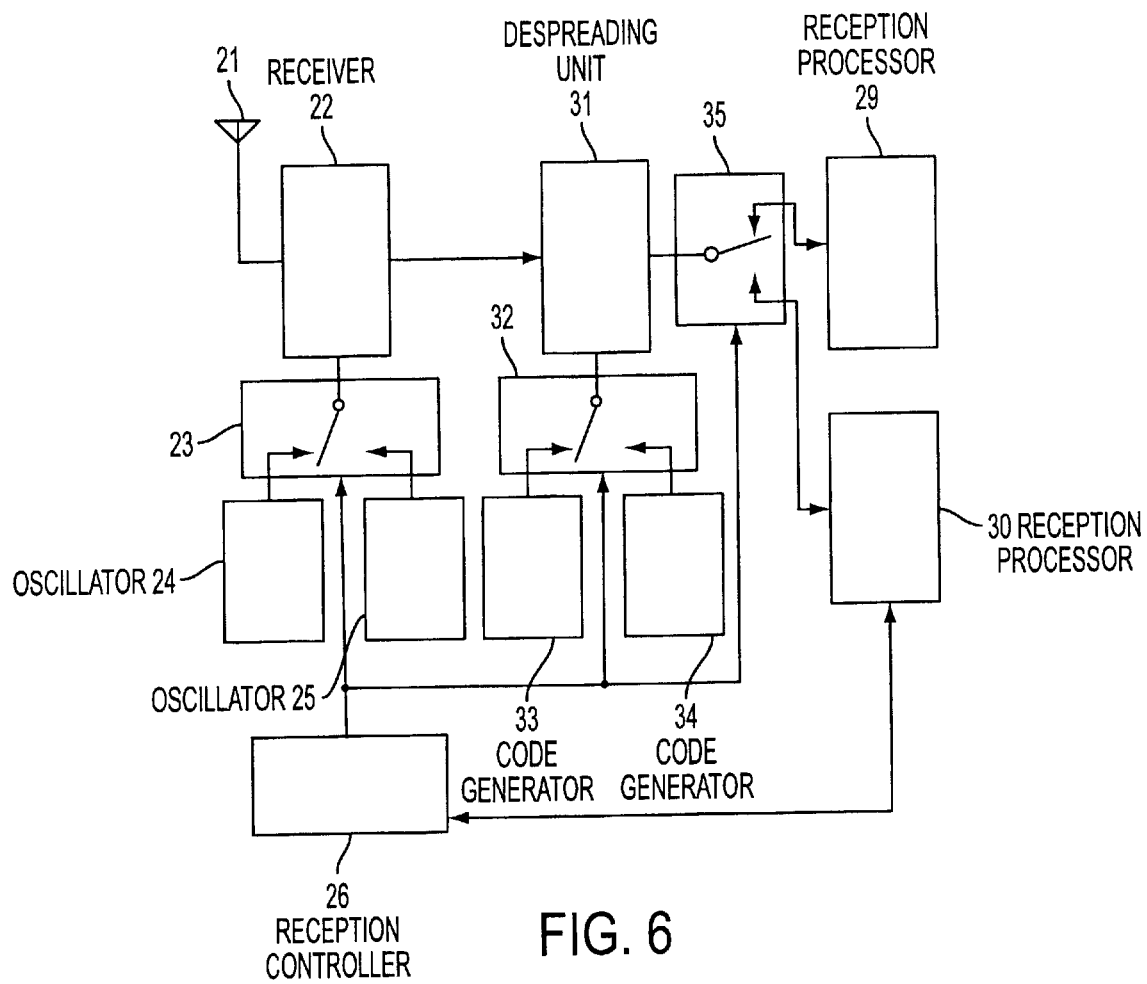
FIG. 6 is a diagram showing a second embodiment of a mobile station according to the present invention.

FIG. 6 shows a second embodiment of a mobile station according to the present invention. The same reference numbers as those of FIG. 4 represent like parts. Reference numeral 31 designates a despreading unit, 32, 25 switches, 33 a traffic channel code generator, and 34 a perch channel code generator. Since traffic channel reception and perch channel reception are carried out in time division, the switch 32 switches the code generators 33, 34 from one to another, to share the despreading unit 31.

When the switches 23, 32, 35 are set as shown in the figure, the oscillator 24, code generator 33, and reception processor 29 are selected to receive a signal from a traffic channel. The signal is demodulated, despread according to a traffic channel code and processed. After a period corresponding to two normal frames, the switches 23, 32, 35 are changed from the states of FIG. 6 to receive two frames from a perch channel. The signal is demodulated, despread according to a perch channel code, and processed.

Figure 7:
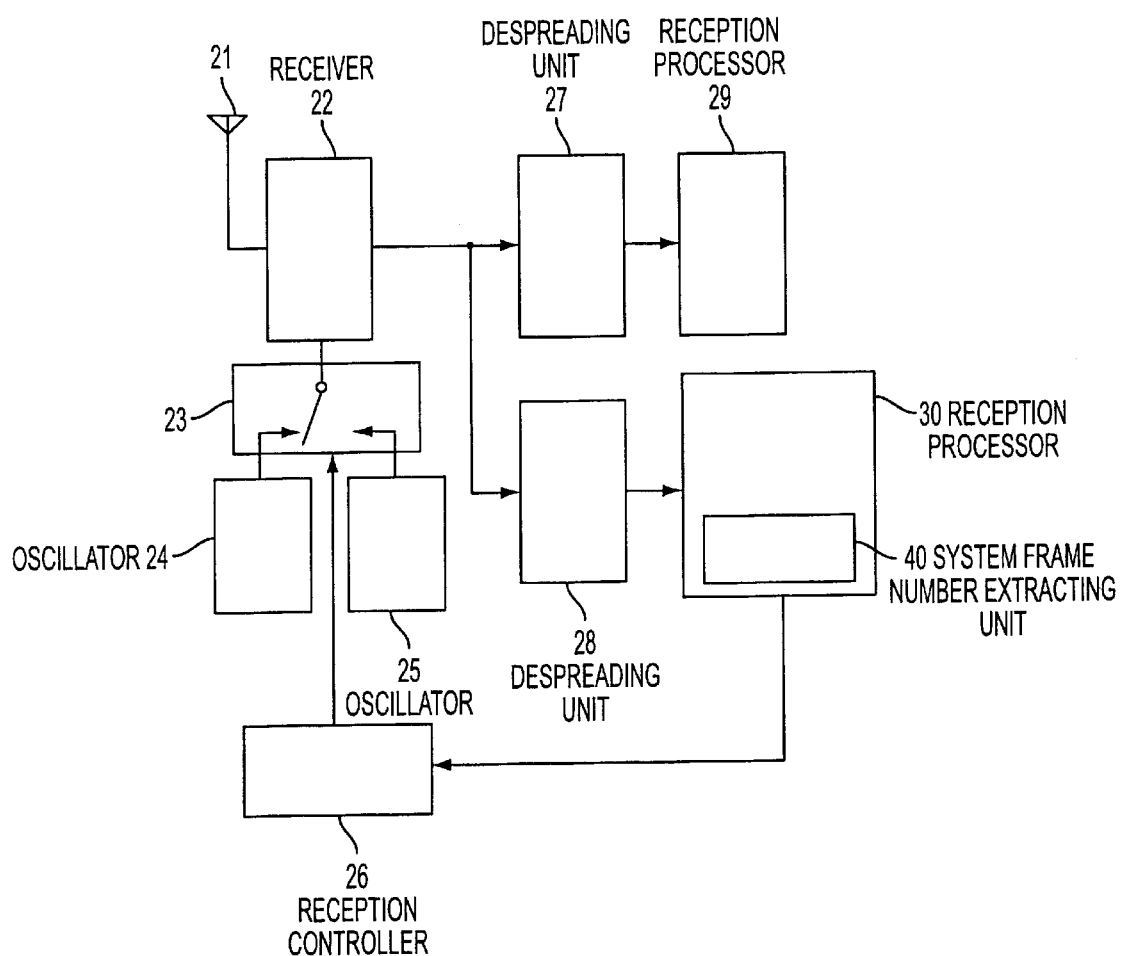
FIG. 7 is a diagram showing a third embodiment of a mobile station according to the present invention.

FIG. 7 shows a third embodiment of a mobile station according to the present invention. The same reference numbers as those of FIG. 4 represent like parts. In this embodiment, reference numeral 40 designates a system frame number extracting unit. The extracting unit 40 switches the switch 23 to the oscillator 25 to select a perch channel frequency. As a result, two frames are received from the perch channel, are searched for errors, and are separated into individual frames according to a deinterleave process. A data detection process is then carried out on each of the frames to extract a system frame number.

If the two frames are separately received from the perch channel at this time, the deinterleave process is unable to correctly restore the individual frames. Thus, the extracting unit 40 is unable to extract the system frame number. In this case, the reception controller 26 controls the switching timing of the switch 23 so that the reception timing of the perch channel is shifted by a frame of the perch channel.

Figure 8:
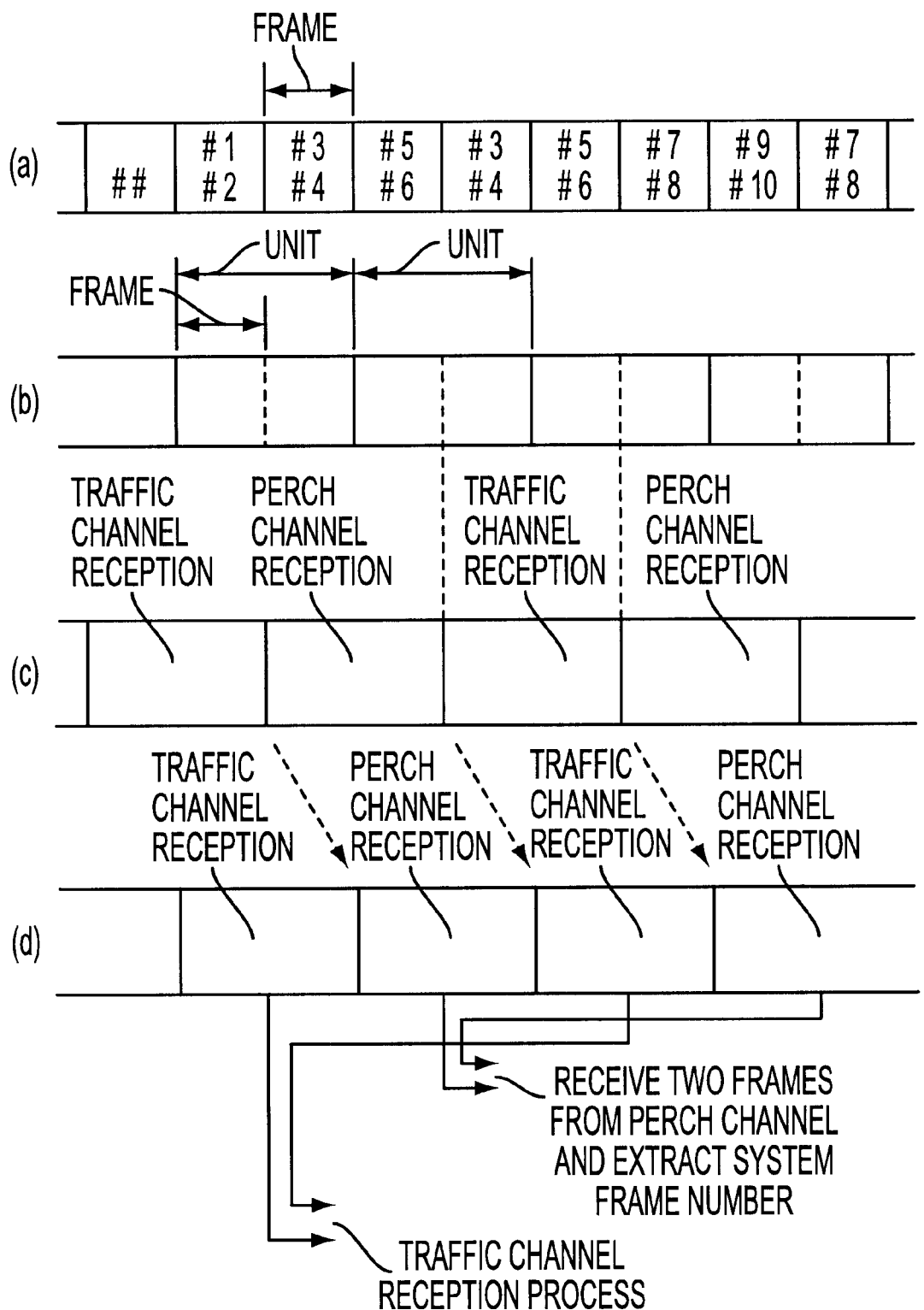
FIG. 8 is a diagram showing the operation of the mobile station of FIG. 7.

FIG. 8 shows the operation of the mobile station of FIG. 7. In FIG. 8, (a) shows compressed frames transmitted through a traffic channel in the compression mode, (b) shows frames transmitted through the perch channel and (c) shows the timing of the mobile station for switching the traffic channel reception and perch channel reception from one to another. In this case, the mobile station separately receives two interleaved frames as explained above.

To cope with this problem, the traffic channel reception and perch channel reception are shifted by one frame according to the detection of a frame head, as shown in (d) of FIG. 8. As a result, the mobile station correctly receives every two frames from the perch channel and is able to extract a system frame number.

Figure 9:
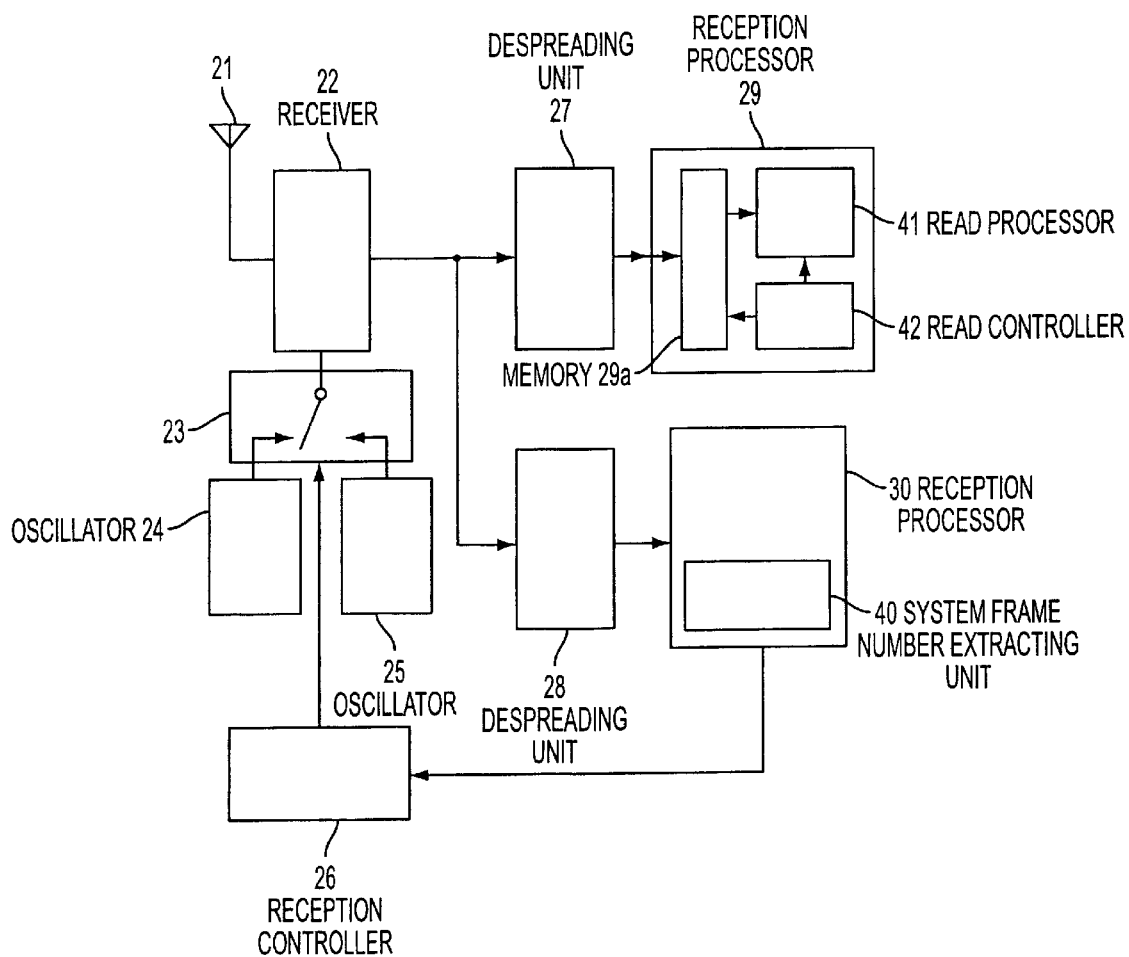
FIG. 9 is a diagram showing a fourth embodiment of a mobile station according to the present invention.

FIG. 9 shows a fourth embodiment of a mobile station according to the present invention. The same reference numbers as those of FIG. 4 represent like parts. In this embodiment, reference numeral 41 designates a read processor and 42 a read controller. This embodiment is capable of restoring data received from a traffic channel in the compression mode even if the head of a frame received from the traffic channel deviates from the head of a frame received from a perch channel.

Figure 10:
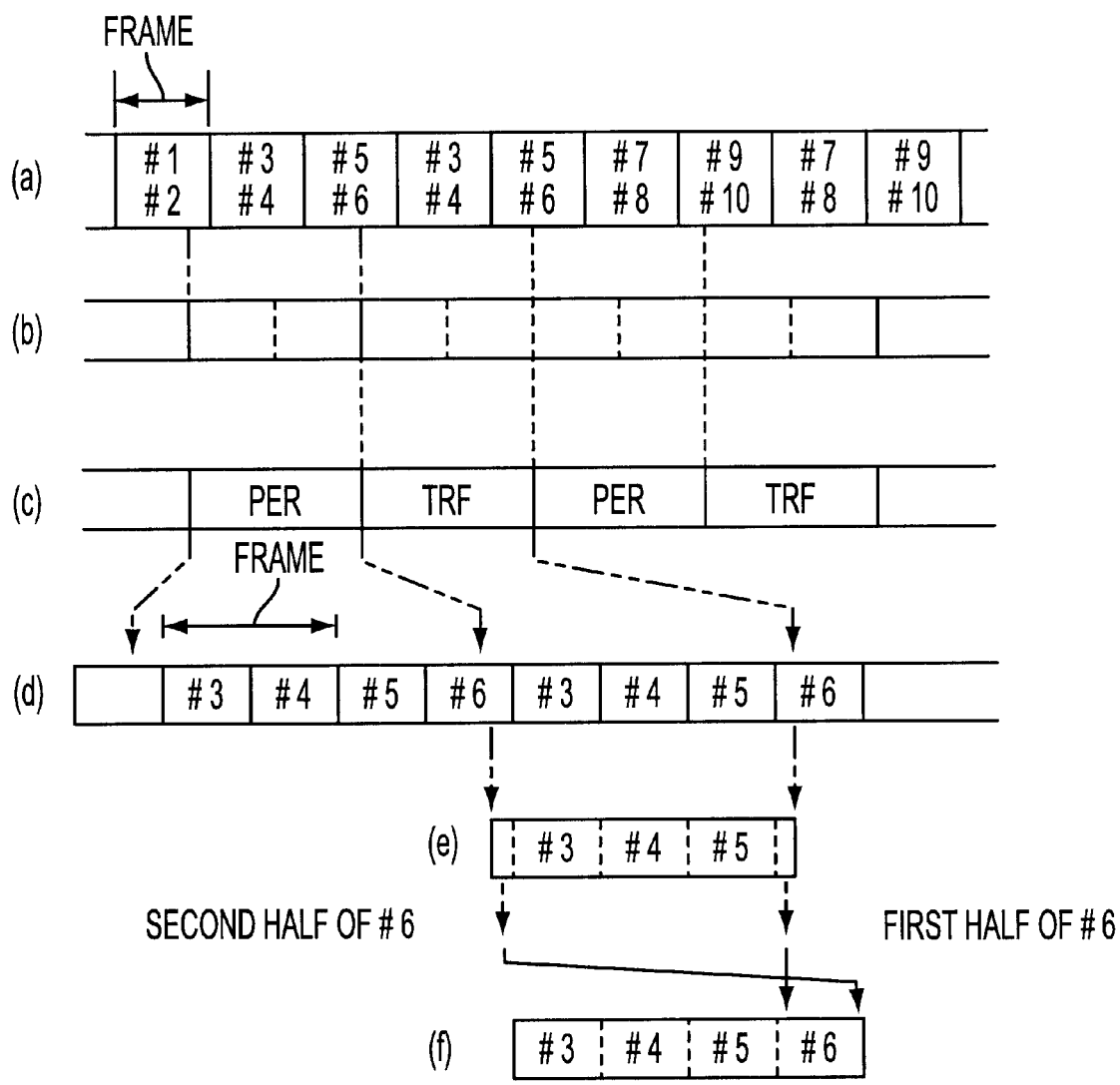
FIG. 10 is a diagram showing the operation of the mobile station of FIG. 4.

FIG. 10 shows the operation of the mobile station of FIG. 9. In FIG. 10, (a) shows compressed frames #1, #2, #3 and the like transmitted through the traffic channel in the compression mode. The head of each of these frames is not aligned with the head of a corresponding frame received from the perch channel as shown in (b) of FIG. 10. In this case, the mobile station switches the reception of the perch channel PER and the reception of the traffic channel TRF from one to another at the head of a frame of the perch channel, as shown in (c) of FIG. 10. As a result, as shown in a temporally enlarged views (d) and (e) of FIG. 10, the second half of a frame #6, frames #3 to #5, and the first half of the frame #6 are received from the traffic channel in a reception period TRF.

The reception processor 29 stores compressed frames received from the traffic channel in the memory 29a and reads them at a normal rate to recover the original states of the frames. In other words, the second half of frame #6, frames #3 to #5, and the first half of frame #6 are received and stored in the memory 29a. These frames are then read from the memory 29a at the normal rate. At this time, the frame #3 is read first from the head since frame #3 is the first frame to be detected from the head thereof. Frames #4 and #5 are then read. Thereafter, the first half of the frame #6 and the second half thereof are read. Consequently, the frames #3 to #6 are completely restored, as shown in (f) of FIG. 10.

Figure 11:
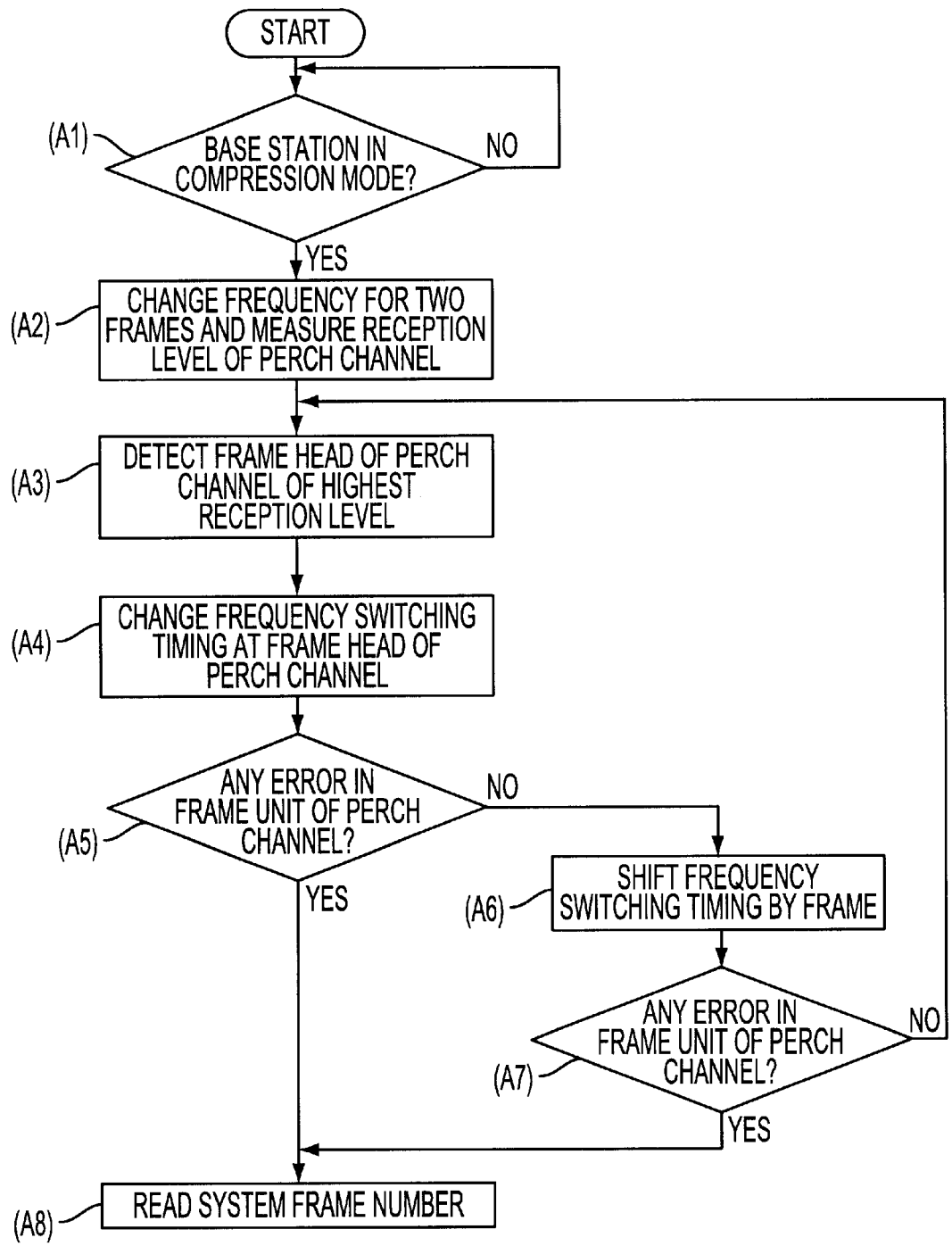
FIG. 11 is a flowchart showing the operation according to the present invention.
Figure 12:
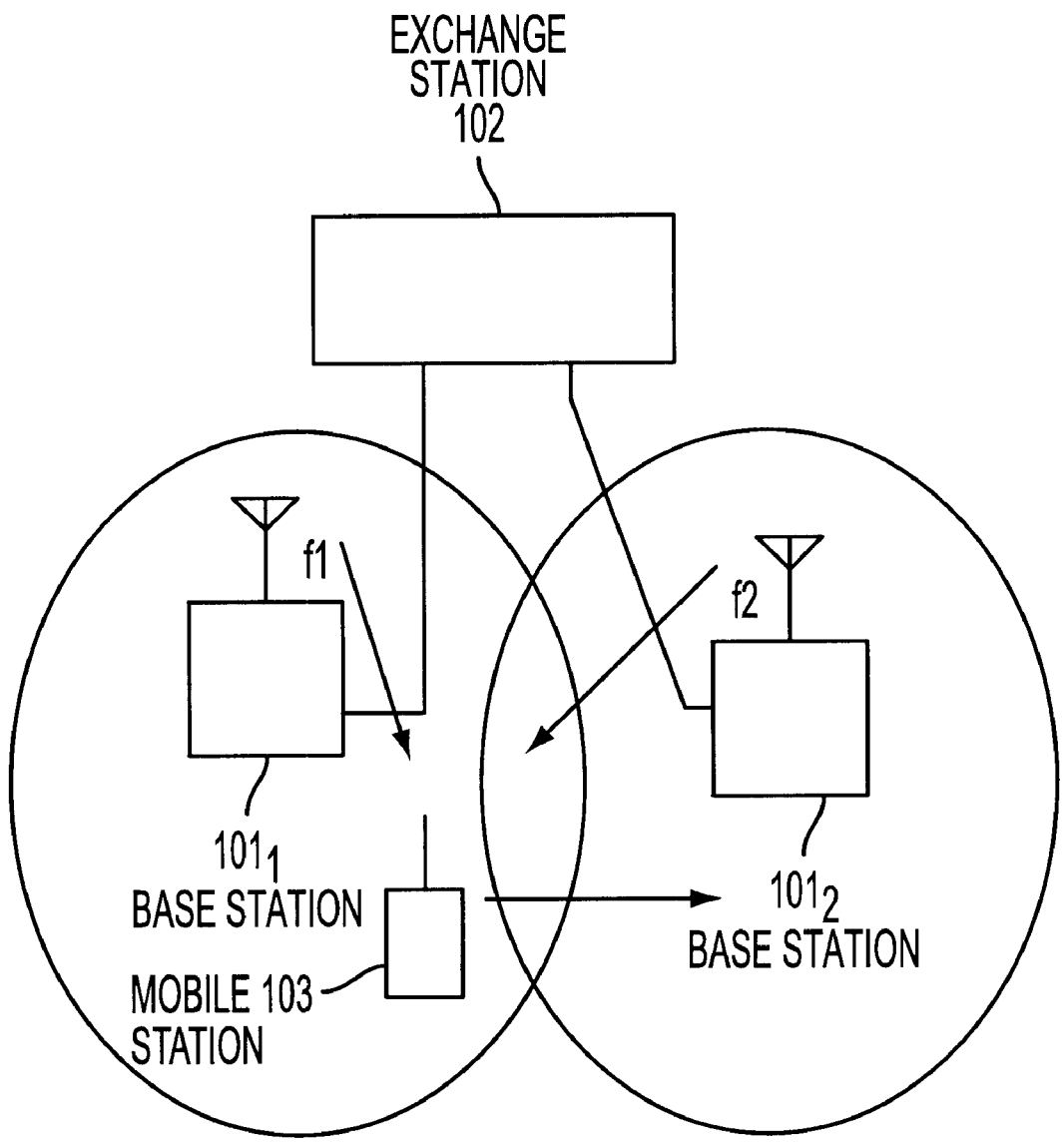
FIG. 12 is a diagram showing a handover operation.
Figure 13:
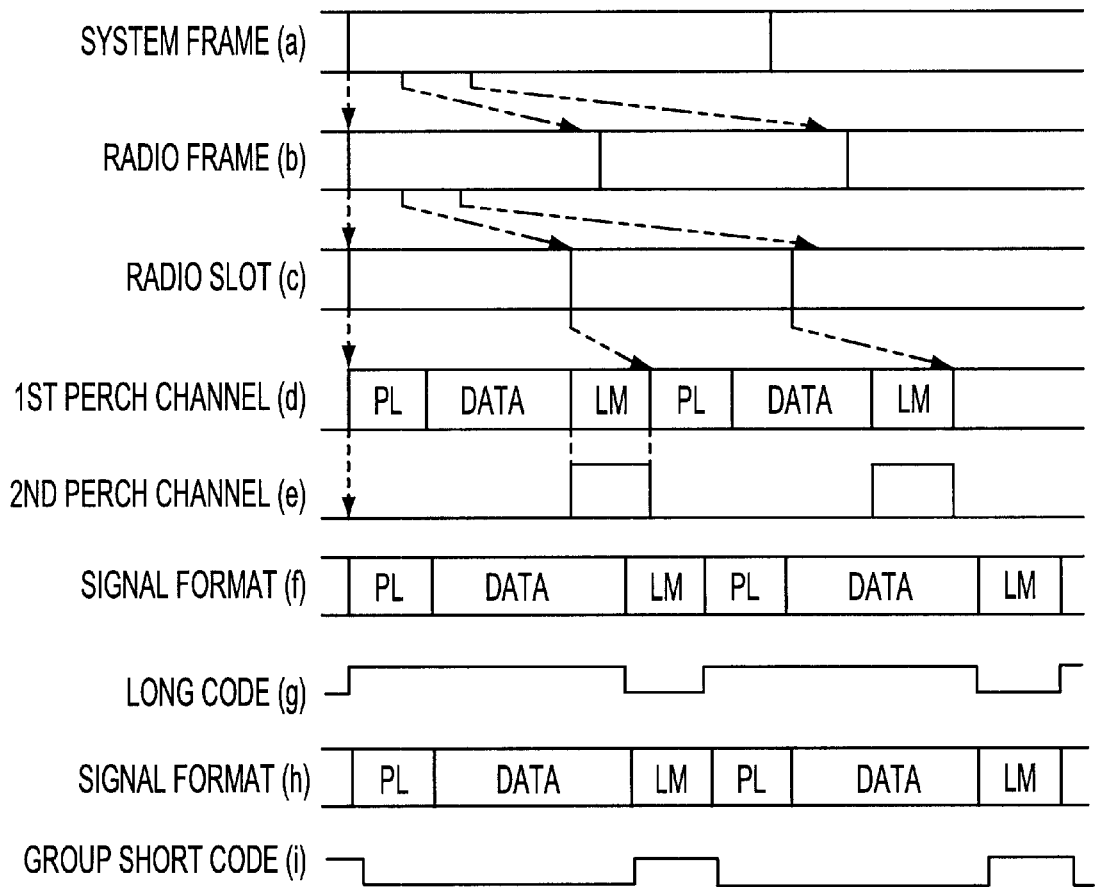
FIG. 13 is a diagram showing a signal format of a perch channel.
Figure 14:
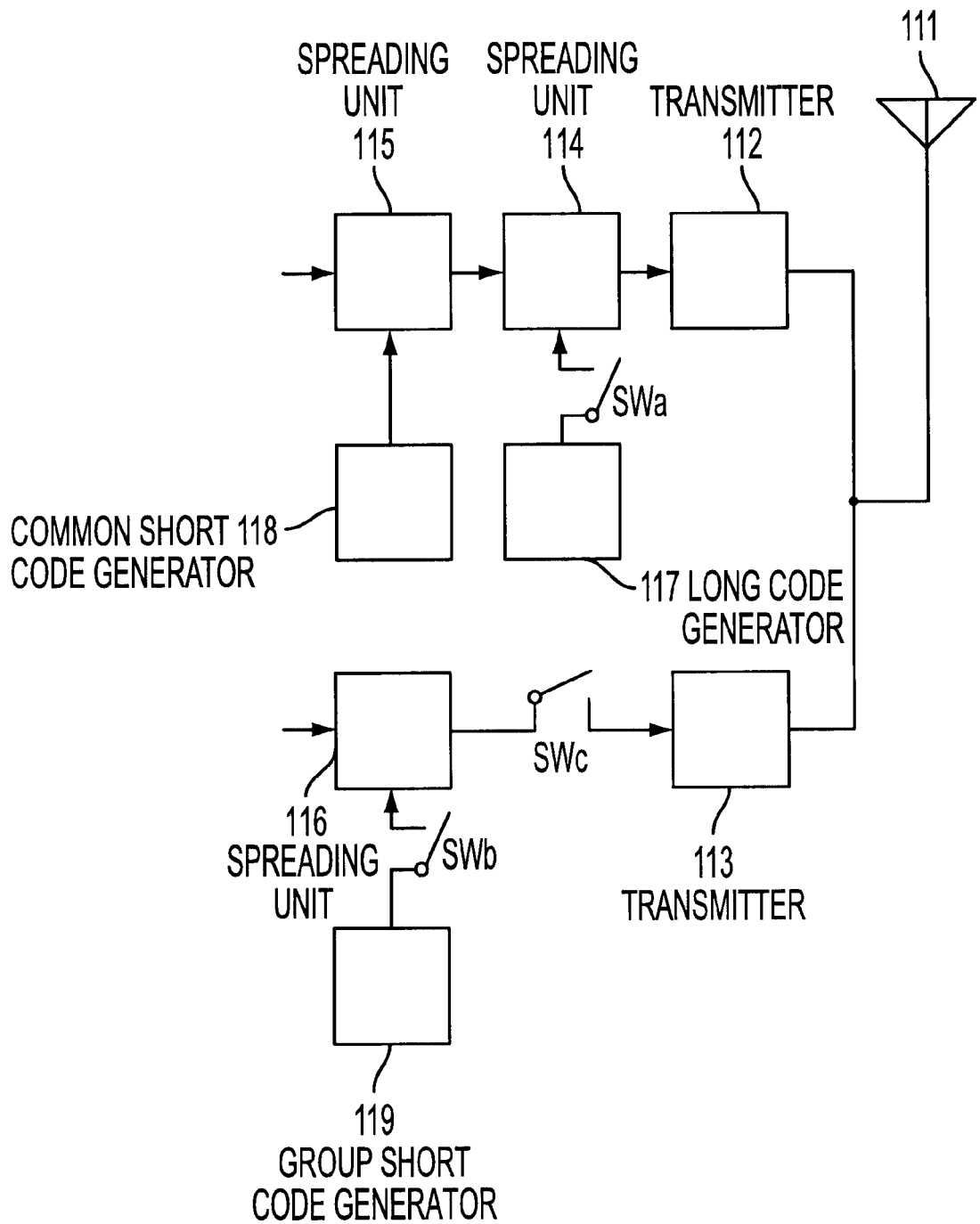
FIG. 14 is a diagram showing a perch channel transmitter of a base station.
Figure 15:
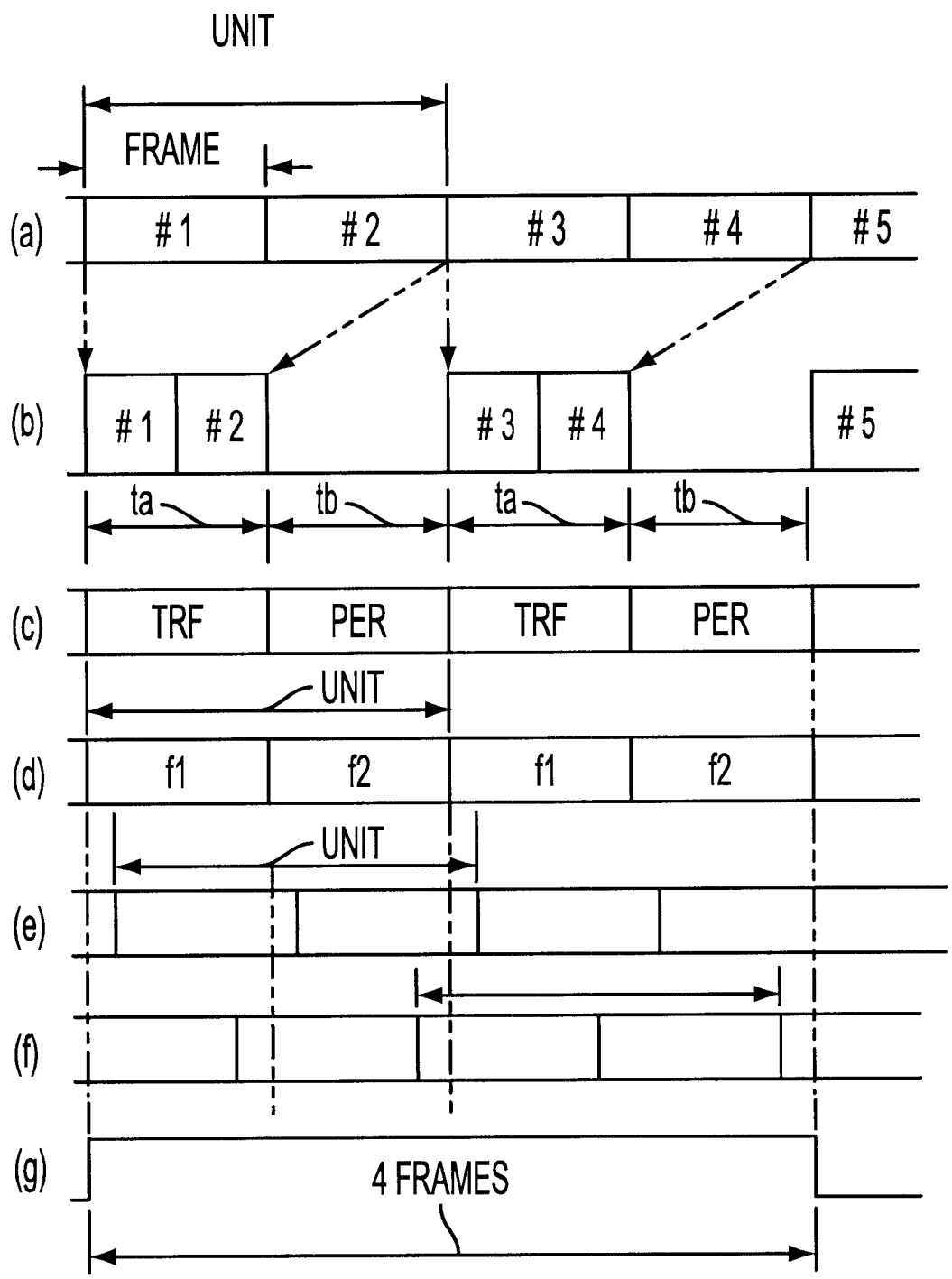
FIG. 15 is a diagram showing a compression mode according to the prior art.

FIG. 11 shows the operation of the present invention. The mobile station determines whether or not the traffic channel of the presently communicating base station is in the compression mode in step A1. This determination is carried out according to a report transmitted from the base station. If the base station is in the compression mode, the reception frequency is switched for a two-frame period at a predetermined timing to measure the reception level of each perch channel in step A2. The head of a frame in the perch channel having a highest reception level is detected in step A3. According to the detected frame head, the timing of frequency switching is set in step A4.

At a perch channel frequency, a unit of two frames is received from the perch channel and is searched for an error in step A5. If there is no error, a system frame number is extracted from the frames in step A8. If there is an error, it is determined that the received frames are not two interleaved frames and the timing of frequency switching is shifted by one frame in step A6. An error detection is carried out on a unit of frames received from the perch channel in step A7. If there is no error, step A8 is carried out. If there is an error, step A3 is repeated.

This embodiment suppresses a delay in a traffic channel in the compression mode to two frames. The embodiment enables the mobile station to reliably receive two frames from a perch channel and to continuously receive frames from the traffic channel without a dropout.

The present invention is not limited to the embodiment mentioned above, and various additions and modifications to the embodiment are possible. For example, a signal unit to be temporally compressed may consist of not only two frames but also frames of more than two. The oscillators 24, 25 of the mobile station for switching reception frequencies may be a synthesizer that can change the oscillation frequency of a single oscillator. Instead of alternating the traffic channel and perch channel code generators 33, 34, a single code generator may be arranged to alternately generate a traffic channel despreading code and a perch channel despreading code. Similarly, the reception processors 29 and 30 may be replaced with a single reception processor that switches a traffic channel reception process and a perch channel reception process from one to another.

As explained above, the present invention provides a handover method, a base station, a mobile station, and a mobile communication system capable of carrying out an inter-frequency handover operation for CDMA communication without increasing a transmission delay in a traffic channel in the compression mode. These units are also capable of reliably receiving units of frames at the mobile station from a perch channel to extract a system frame number from the received frames while receiving frames from a traffic channel without a dropout.

What is claimed is:

1. A handover method for a CDMA mobile communication system including a base station and a mobile station, comprising the steps of:

compressing traffic channel frames into a compressed signal unit having at least double a number of frames contained in a normal-mode signal unit in the base station;

transmitting the compressed signal unit repeatedly from the base station to the mobile station;

switching the mobile station between a traffic channel including the compressed signal unit transmitted repeatedly from the base station and a perch channel from another base station;

alternating reception frequencies of the mobile station at intervals of a period of the normal-mode signal unit according to frames received from the perch channel, thereby receiving frames alternately from the traffic and perch channels;

extracting a system frame number from the frames received from the perch channel; and receiving from the traffic channel a first signal unit containing the second half of a given frame during a first unit period, and a second signal unit containing the first half of a given frame during a second unit period to recover the original state of the given frame by combining the first and second halves at the mobile station when the mobile station is unable to receive the whole given frame in a single signal unit.

2. A mobile station for carrying out CDMA communication with base stations, comprising:

a receiver for switching between a traffic-channel reception frequency and a perch-channel reception frequency to receive signals alternately from a traffic channel from the base station in communication and a perch channel from another base station when the base station repeatedly transmits signals through a traffic channel in a compression mode; and a reception controller for detecting the head of a frame received from the perch channel and for switching the traffic channel and perch channel reception frequencies from one to another at the detected frame head at intervals of a normal-mode unit period.

3. The mobile station of claim 2 further comprising:

a despreading unit for switching a despreading code for the traffic channel and a despreading code for the perch channel in synchronization with the switching of the traffic channel and perch channel reception frequencies in the receiver.

4. The mobile station of claim 2, wherein the reception controller shifts the timing of the switching of the traffic channel and perch channel reception frequencies in the receiver by a frame of the perch channel so that a system frame number is extracted.

5. The mobile station of claim 2, further comprising:

a memory for storing frames received from the traffic channel when the receiver switches between the traffic channel and perch channel reception frequencies;

a read controller for reading a head of each frame out of the memory.

6. The mobile station of claim 5, wherein the read controller reads a first half and a second half of a frame, and then combines the first and second half if unable to read the head of any frame.

7. A mobile communication system having distributed base stations and a mobile station that carries out CDMA communication with the base stations, comprising:

one of the base stations compressing traffic channel frames into a compressed signal unit having at least double a number of frames contained in a normal-mode signal unit and repeatedly transmitting the compressed signal unit; and the mobile station having a receiver for switching between a traffic-channel reception frequency and a perch-channel reception frequency to alternately receive a traffic channel including the compressed signal unit and a perch channel;

wherein the mobile station further includes a reception controller for detecting a head of a frame received from the perch channel and switching the traffic channel and perch channel reception frequencies from one to another at the detected frame head at intervals of a normal-mode unit period corresponding to the normal-mode signal unit.

8. The system of claim 7, wherein the base station includes:
- a data processor for compressing traffic channel frames into a compressed signal unit having at least double a number of frames contained in a normal-mode signal unit;
- a memory for storing the compressed signal unit; and
- a transmission controller for transmitting the compressed signal unit after reading the compressed signal unit out of the memory.

9. The system of claim 7, wherein the reception controller shifts a timing of the switching of the traffic channel and perch channel reception frequencies in the receiver by a frame of the perch channel so that a system frame number is extracted.

10. The system of claim 7, wherein the reception controller shifts a timing of the switching of the traffic channel and perch channel reception frequencies in the receiver by a frame of the perch channel so that a system frame number is extracted.

11. The system of claim 7, wherein the mobile station further includes a memory for storing frames received from the traffic channel when the receiver switches between the traffic channel and perch channel reception frequencies.

12. The system of claim 11 wherein the mobile station further includes a read controller for reading a head of each frame out of the memory.

13. The system of claim 12, wherein the read controller reads a first half and a second half of a frame, and then combines the first and second halves to form whole frames in the traffic channel.

* * * * *